United States Patent
Giffin, III

(10) Patent No.: US 6,662,546 B1
(45) Date of Patent: Dec. 16, 2003

(54) GAS TURBINE ENGINE FAN

(75) Inventor: Rollin George Giffin, III, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 08/123,906

(22) Filed: Jun. 23, 1993

(51) Int. Cl.⁷ .................. F42G 3/00; H01Q 17/00
(52) U.S. Cl. .................. 60/39.5; 60/39.183; 342/4
(58) Field of Search .................. 60/39.5, 39.52, 60/39.183; 342/4

(56) References Cited

U.S. PATENT DOCUMENTS

| | | | | |
|---|---|---|---|---|
| 4,170,874 A | * | 10/1979 | Kyrklund | 60/39.18 C |
| 4,275,857 A | * | 6/1981 | Bergsten | 249/53 B |
| 5,208,599 A | * | 5/1993 | Rudduck et al. | 342/4 |
| 5,279,358 A | * | 1/1994 | Hannis | 165/103 |

* cited by examiner

Primary Examiner—Peter A. Nelson
(74) Attorney, Agent, or Firm—Nathan D. Herkamp; Steven J. Rosen

(57) ABSTRACT

An aircraft gas turbine engine is provided with low observable fan features which reduce the radar signature of the engine and its aircraft. An aircraft gas turbine engine fan section has in direct serial flow relationship an inlet having fixed high swirl angle inlet guide vanes, a first stage of first fan rotor blades, a stage of first variable angle stator vanes, and a fan bleed. The inlet guide vanes are angled to block the linear line of sight of the rotating fan blades through the inlet and include a RAM treatment which preferably is a coating of a radar absorbing material on the surface of the inlet guide vanes. The exemplary embodiment has a multi-stage fan section with the mid-stage fan bleed disposed between the first and second stages of fan rotor blades.

9 Claims, 1 Drawing Sheet

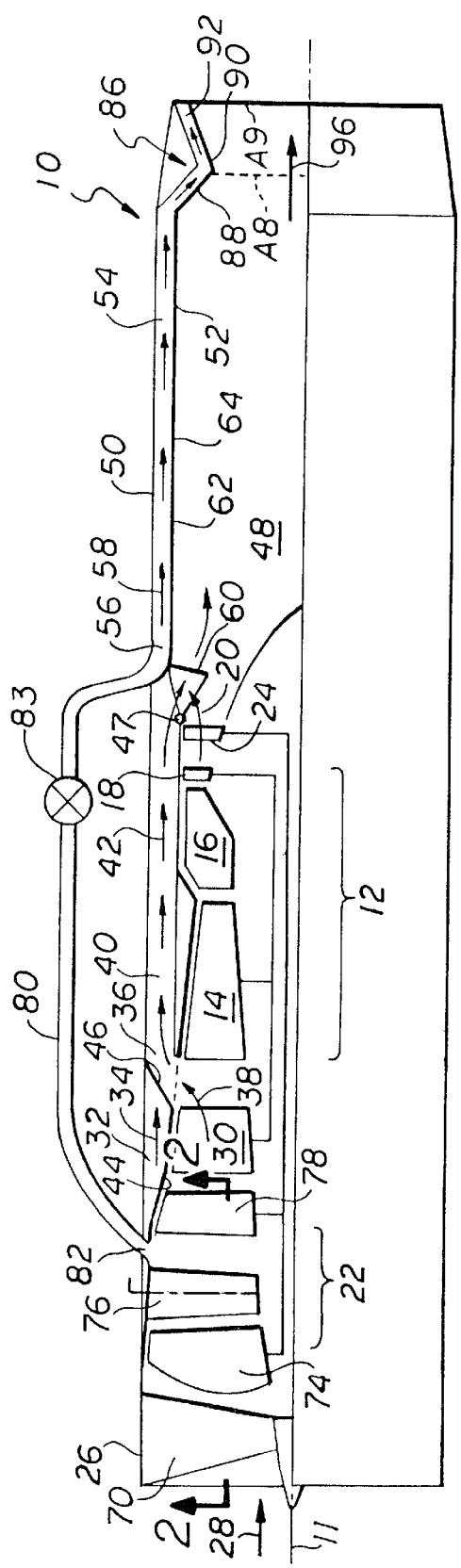
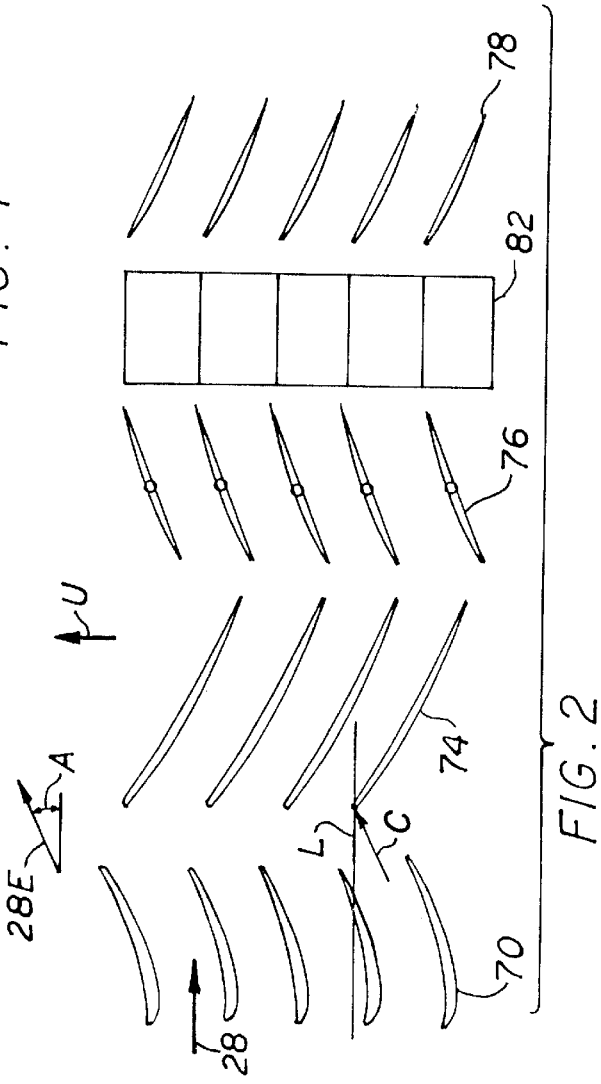
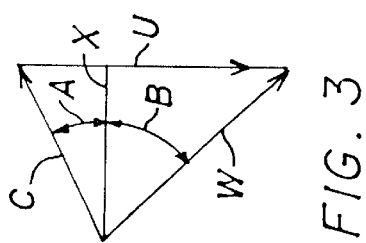
FIG. 1
FIG. 2
FIG. 3

GAS TURBINE ENGINE FAN

BACKGROUND OF THE INVENTION

1. Field of the Invention

This invention relates to aircraft gas turbine engines with low observable fan design features which reduce the radar signature of the engine and its aircraft and more particularly to fixed angle high swirl inlet guide vanes coated with radar absorbing material.

2. Description of Related Art

Gas turbine engines generally comprise a compressor for compressing air flowing through the engine, a combustor in which fuel is mixed with the compressed air and ignited to form a high energy gas stream, and a turbine for driving the compressor. One type of gas turbine engine for an aircraft is the turbojet in which thrust is provided by the high velocity gas stream exiting the turbine.

A second type of aircraft gas turbine engine is the turbofan in which a fan is mounted forward of the compressor and is driven by a second turbine or power turbine mounted downstream of the first turbine. The fan produces a flow of pressurized air which is split into two portions. The first portion enters an outer bypass duct for bypassing the core engine and the second portion enters the compressor of the core engine. One advantage of the turbofan engine over the turbojet is that it is more fuel efficient for a given thrust output of the engine.

Another feature which may be utilized to increase the thrust output of a gas turbine engine is an augmentor. In an augmented gas turbine engine, an exhaust duct is provided downstream of the turbine(s). Additional fuel is injected into the exhaust duct and is ignited to increase the energy of the gas stream. The gas stream is ejected through an exhaust nozzle to increase the thrust output of the engine. Augmenters for high performance military aircraft are particularly useful and desirable. A typical augmentor disposed in the exhaust duct of the engine requires protection from the extremely high temperatures associated with the gas flow within the augmentor. A cooling liner is typically positioned within the exhaust duct so as to form a cooling duct therebetween and a portion of the bypass flow is diverted into this cooling duct for cooling of the same and to optionally convey cooling air to an exhaust nozzle to cool the nozzle.

A characteristic of turbofan engines, especially low fan pressure ratio (pressure increase across the fan section of the engine) turbofan engines, is relatively low specific fuel consumption at subsonic speeds. A characteristic of turbojet and relatively high fan pressure ratio turbofan engines is relatively high specific thrust characteristics at supersonic speeds. In order to satisfy the need for aircraft which must efficiently operate over a wide range of subsonic and supersonic speeds, so-called variable cycle engines have been developed. Such variable cycle engines are characterized by the capability to change the bypass ratio of the engine during operation. For example. U.S. Pat. Nos. 4,010,608 and 4,961, 312 by Simmons and 4,175,384 by Wagenknecht et al disclose variable cycle engines. These variable cycle engines include an outer bypass duct and a variable area bypass injector for modulating the flow through the bypass duct thereby varying the engine cycle.

A fundamental problem in the design and operation of augmented variable cycle engine is the matching of bypass airflow requirements to the airflow requirements of the combustion process in and cooling of the augmentor combustor and the cooling of the augmenter liner. Control of the bypass air has typically been accomplished by variable bypass systems that use bypass doors such as those disclosed in the patents referenced above. The Wagenknecht patent (4,175,384) further discloses a variable area bypass injector (VABI) wherein the VABI comprises generally two variable geometry flow devices, a double-bypass selector valve and a static pressure valve. The VABI in Wagenknecht is included in a double bypass, variable cycle engine for selectively mixing co-annular bypass streams. Further disclosed is a multiple stage fan section having a variable inlet guide vane and variable stator vanes upstream of a mid-stage fan VABI as well as between all fan rotor blades is disclosed for modulating the airflow through the fan section of the engine and the fan VABI. U.S. patent application No. 07/484,083, entitled "Variable Cycle Turbofan Ramjet Engine" by Johnson et al, filed Feb. 22. 1990, and presently allowed discloses the use of an variable stator vane aft of the first by-pass duct.

Modern day military aircraft and particularly combat aircraft have a great need to employ techniques for reducing the radar signature of the aircraft and its gas turbine engine. Such radar signature reducing techniques may also be referred to as low observable or LO techniques. One such LO technique is to use inlet guide vanes having fixed forward portions and variable angle aft portions such that the inlet guide vanes are angled with respect to the line of sight through the inlet so as to prevent direct observation of the rotating fan blades. These conventional RAM coated inlet guide vanes are designed to essentially swirl the inlet flow to hide at least a large part of the fan blades then deswirl the flow before it enters the blades. Such a technique is disclosed in U.S. patent application No. 06/536,792 entitled "Low Radar Cross Section Engine Inlet Axial Line of Sight Blocked" by Giffin et al, filed Sep. 26, 1983, and presently allowed; and essentially blocks all possible linear lines of sight into the rotating equipment and provides the inlet guide vanes with a coating of radar absorbing material or RAM, of which there are several known materials. However, the use of variable stator vanes in the inlet including inlet guide vanes that are fully or partially variable increases the radar signature of the inlet because they introduce more radar observable edges.

Centrifugal forces acting on the fan blades is an obstacle to using RAM coatings on fan blades for additional LO capabilities and performance. One effect of inlet preswirl is to reduce rotor inlet Mach Number which enhances the tolerance to the thickness of coatings on the fan blades. Therefore fixed angle inlet guide vanes are better for radar signature reducing techniques and there is a great need for an aircraft gas turbine engine inlet and fan design incorporating RAM coated fixed angle inlet guide vanes to more effectively reduce the radar signature of aircraft and their gas turbine engines.

SUMMARY OF THE INVENTION

The present invention provides an aircraft gas turbine engine with low observable fan design features which reduce the radar signature of the engine and its aircraft. An aircraft gas turbine engine fan section has in direct serial flow relationship an inlet having fixed angle high swirl angle inlet guide vanes, a first stage of first fan rotor blades, a stage of first variable angle stator vanes, and a preferably mid-stage fan bleed. The inlet guide vanes are angled to block the linear line of sight of the rotating fan blades through the inlet and include a RAM treatment which preferably is a coating of a radar absorbing material on the surface of the inlet guide vanes.

The exemplary embodiment has a multi-stage fan section with the mid-stage fan bleed disposed between the first and second stages of fan rotor blades and the engine is a variable cycle gas turbine engine. The mid-stage fan bleed is used to provide cooling air, preferably to cool a nozzle which in one embodiment has a variable throat. The nozzle's convergent flaps and seals and its divergent flaps and seals may be internally cooled by this cooling air. Aft of the throat area A8 this cooling air may be used to film cool the divergent flaps and/or seals through film cooling slots or holes, as long as the local pressure at that point is sufficiently below the pressure of the cooling air which is substantially that of the fan bleed air so as to allow it to flow into the nozzle flow stream.

ADVANTAGES

The present invention provides an improved means for applying LO techniques to aircraft gas turbine engines that use variable stator vanes to control bleed flow downstream of the engine's inlet. It is useful for use in turbo-fan engines and variable cycle engines that have variable stator vanes including fan stage variable stator vanes. The invention provides better low observable fan design features which reduces the radar signature of the engine and its aircraft.

BRIEF DESCRIPTION OF THE DRAWINGS

The foregoing aspects and other features of the invention are explained in the following description, taken in connection with the accompanying drawings where:

FIG. 1 is a schematic cross-sectional view of an aircraft gas turbine engine having a fan and fan air bypass arrangement in accordance with one embodiment of the present invention.

FIG. 2 is an annular cross-sectional planform view of a portion of the fan section airfoil arrangement of the vanes, blades, and bypass of the engine illustrated in FIG. 1 taken through 2—2 in FIG. 1.

FIG. 3 is a velocity diagram of an exemplary first fan blade illustrated in FIG. 2.

DETAILED DESCRIPTION OF THE INVENTION

Illustrated in FIG. 1 is a mixed flow, variable cycle gas turbine engine 10 disposed about an engine centerline axis 11 having a core engine 12 which includes a high pressure compressor 14 for compressing air flowing therethrough, a combustor 16 where fuel is mixed with the air to form a high energy gas stream, and a high pressure turbine 18 which extracts energy from the gas stream for driving compressor 14. The core engine 12 generates a hot energized gas flow 20. Engine 10 further includes a fan section of the gas turbine engine 10 generally indicated by a multi-stage front fan 22 driven by a second turbine 24 which extracts energy from the gas flow 20 and is located aft of the first turbine 18. The front fan 22 is located just downstream of an inlet 26 which, at least for the purposes of this patent, is considered part of the fan section and is effective for pressurizing air 28 that enters the inlet 26. An aft fan 30, to further pressurize air flowing therethrough, is located downstream of the front fan 22 and is also driven by the high pressure turbine 18. However, it will be clear that the invention is not limited to this configuration and may be driven by the second turbine 24 or third turbine (not shown).

A bypass duct 40 directs a bypass flow 42 around the core engine 12 and includes a first bypass duct inlet 32 which directs a first bypass inlet airflow 34 around the aft fan 30. A second bypass duct inlet 36 directs a second bypass inlet airflow 38 from the aft fan 30 into the bypass duct 40. In this manner, the second airflow 38 is mixed with first airflow 34 thereby further forming the bypass flow 42. A bypass flow varying means for varying the bypass flow pressure in bypass duct 40 is shown in the form of first and second diverter valves at 44 and 46 respectively, though other types of varying means are contemplated such as is disclosed in U.S. Pat. No. 5,155,993 to John L. Baughman and Rollin G. Giffin, III (the present inventor) which is entitled "Apparatus for Compressor Air Extraction".

The inlet 26 includes fixed angle high swirl angle inlet guide vanes 70 followed in direct serial flow relationship by a first stage of first fan blades 74, a stage of first variable angle stator vanes 76, a mid-stage fan bleed 82, and a second stage of second fan blades 78 in the multi-stage front fan 22. The inlet guide vanes 70 are angled to block the linear line of sight (L in FIG. 2) of the rotating fan blades through the inlet 26 and include a RAM treatment which preferably is a coating of a radar absorbing material.

The mid-stage fan bleed 82 bleeds fan air at relatively low fan pressure levels into a fan bleed duct 80 which may include one or more pipes or, as illustrated in the exemplary embodiment of FIG. 1, a co-annular duct around the bypass duct 40. The fan bleed duct 80 is used to cool portions of the engine and the amount of fan air bled off by the mid-stage fan bleed 82 is modulated or controlled by a modulating valve means 83 disposed in the fan bleed duct downstream of the mid-stage fan bleed. Located aft of the core engine 12 is an augmentor 48 surrounded by an exhaust duct 50. A cooling liner 52 is positioned within the duct 50 so as to form a cooling duct 54 therebetween. A receiving means 56 for receiving at least a portion 58 of the fan bleed air from the fan bleed duct 80 into duct 54 is located at the forward end of liner 52 to cool hot running engine components such as the liner and components of a nozzle 86 downstream thereof. A mixing means 60 for mixing bypass flow 42 with gas flow 20 is located aft of core engine 12 and forward of augmentor 48.

The exemplary nozzle 86 is a variable type having a variable throat area A8 and a fixed or variable exit area A9 but the invention is equally applicable to an engine having a fixed throat. The nozzle 86 includes pivotal convergent flaps and seals generally indicated at 88 to which are pivotally connected divergent flaps and seals generally indicated at 90. These flaps and seals may be internally cooled by the portion 58 of the fan bleed air from the fan bleed duct 80. Aft of the throat area A8 this cooling air may be used to film cool the divergent flaps and/or seals through film cooling apertures 92, such as slots or holes, as long as the local pressure at that point is sufficiently below the pressure of the portion 58 of the fan bleed air so as to allow it flow into the nozzle flow stream 96.

Illustrated in cross-sectional planform view and in greater detail in FIG. 2 is the inlet 26 and fan section indicated by fan 22 and the low observable fan design features for the inlet an aircraft gas turbine engine to reduce the radar signature in accordance with the present invention. The inlet guide vanes 70 are of the high swirl angle type which are operable to impart a high degree of swirl to the inlet airflow 28 as it exits the inlet guide vanes 70 as inlet guide vane exit flow 28E with a pre-swirl angle A. The prior art designs deswirled the exit flow 28E such that angle A would be essentially 0° whereas the present invention is designed to have an substantial pre-swirl angle A. For example the inlet guide vane exit flow 28E might be designed to operate with a pre-swirl angle A=25°.

As such the inlet guide vanes 70 are angled to substantially block the linear line of sight L of the rotating components, such as the first and second fan blades 74 and 78 respectively, through the inlet 26. The RAM coating on the inlet treatment guide vanes 70, preferably a coating of a radar absorbing material further enhances the low observable features of the present invention in order to reduce the radar signature of the aircraft and its engine.

The high swirl angle inlet guide vanes 70 reduce the frame length because the inlet flow is not unswirled as in the case of engines found in the prior art that have RAM coated inlet guide vanes. The multi-stage design of the fan allows the front fan 22 to be operated at a lower wheel speed. The lower wheel speed of the rotor also makes the rotor including the fan blades such as first fan blades 74 more suitable for RAM coatings because of the reduced centrifugal force. Though the leading edge thickness of the blades will increase due to the RAM coating thickness it will not be as penalizing because the Mach number of the flow entering the first fan blades 74 is lower than it would be for a fan having lower inlet swirl or no inlet swirl at all. The Mach number of the flow entering the first fan blades 74 is also lower due to the use of a multi-stage fan as opposed to a single stage fan.

The lower wheel speed makes putting a RAM coating on the first fan blades 74 more practical, if it is so desired, just from a strength standpoint because the centrifugal load that has to be sustained due to the wheel speed is lower than prior art designs. Two or more fan stages permits the fan stages to operate at lower pressure ratios per stage. Typically a fan section operates with a pressure ratio of 2–2.5, which for a single fan stage requires all of this pressure rise to be accomplished across a single stage. The exemplary embodiment provides two stages for which the pressure ratio is about the square root of two and one-half which is about 1.6 per stage. This results in a lower temperature coming out of the first stage fan blades 74 which is good for cooling purposes.

An exemplary velocity diagram for one of the first fan blades 74 of the present invention is shown in FIG. 3 having 25° of pre-swirl as compared to a conventional engine having inlet guide vanes with no pre-swirl and the inlet flow being axial would have a rotor Mach No. of 0.9 compared to 1.1. The absolute air velocity C is the inlet guide vane exit flow 28E in FIG. 2 and W is the relative air velocity from the frame of reference on a first fan blade 74 and with respect to an axial line X which is essentially parallel to the engine centerline axis 11 in FIG. 1. U is the wheel speed of the rotor which gives rise to a rotor blade angle B which is the angle between the relative incoming air velocity W and the axial line X at the blade inlet. An incoming relative velocity angle is the algebraic sum of angles A and B between the absolute incoming air velocity C of the blade and the relative incoming air velocity W. As a sample comparison, the rotor blade angle B with respect to the axial line X of the first blade is 42° for a pre-swirl angle A of 25° as compared to 56° for a conventional engine with no pre-swirl to the first fan blades. This would result, for an exemplary design, in the first fan blades 74 having a rotor inlet Mach No. of 0.9 compared to 1.1 for the 0° pre-swirl blades. Note that the incoming relative velocity angle will vary in the radial direction in FIG. 1 for a given first fan blade 74 to accommodate local flow conditions because the typically such blades are given a twist as is well known in the art.

It will be clear to those skilled in the art that the present invention is not limited to the specific embodiments described and illustrated herein. Rather, it applies equally to any gas turbine engine with means to vary the bypass flow in the fan section of the engine. It will be understood that the dimensions and proportional and structural relationships shown in the drawing are by way of example only, and these illustrations are not to be taken as the actual dimensions or proportional structural relationships used in the engine of the present invention.

While the preferred embodiment of the present invention has been described fully in order to explain its principles, it is understood that various modifications or alterations may be made to the preferred embodiment without departing from the scope of the invention as set forth in the appended claims.

I claim:

1. A fan section for an aircraft gas turbine engine, said fan section comprising:
   in direct serial flow relationship;
   an inlet having fixed angle high swirl angle inlet guide vanes,
   a first stage of first fan rotor blades,
   a stage of first variable angle stator vanes, and
   said inlet guide vanes are angled to block the linear line of sight of said fan blades through the inlet and have a radar absorbing material treatment.

2. A fan section as claimed in claim 1 wherein said radar absorbing material treatment is a coating of a radar absorbing material on outer surfaces of said inlet guide vanes.

3. A fan section apparatus as claimed in claim 2 wherein the fan section is a multi-stage fan section having a mid-stage fan bleed disposed between said first stage and a second stage of fan second rotor blades.

4. A gas turbine engine comprising:
   a multi-stage fan section having in direct serial flow relationship;
   an inlet having fixed angle high swirl angle inlet guide vanes,
   a first stage of first fan rotor blades,
   a stage of first variable angle stator vanes, and
   wherein said inlet guide vanes are angled to block the linear line of sight of said fan blades through the inlet and have a radar absorbing material treatment.

5. An engine as claimed in claim 4 further comprising:
   a mid-stage fan bleed disposed between said stage of first variable angle stator vanes and a second stage of fan second rotor blades and
   a fan bleed duct connected in fluid flow supply communication with said mid-stage fan bleed and in fluid flow receiving communication with at least one hot running component of the engine to cool said component.

6. An engine as claimed in claim 5 wherein said one hot running component is an exhaust nozzle.

7. An engine as claimed in claim 6 wherein said nozzle is a variable area throat nozzle.

8. An engine as claimed in claim 7 wherein said nozzle further comprises convergent flaps and seals pivotally attached to divergent flaps and seals respectively wherein at least one of said convergent flaps and seals have internal cooling means and downstream of said throat at least one of said divergent flaps and seals have film cooling means.

9. An engine as claimed in claim 7 wherein said nozzle further comprises convergent flaps and seals pivotally attached to divergent flaps and seals respectively wherein at least one of said divergent flaps and seals have film cooling means located downstream of said throat.

* * * * *